(12) United States Patent
Grosshart et al.

(10) Patent No.: US 6,941,542 B2
(45) Date of Patent: Sep. 6, 2005

(54) PROCESS FOR GENERATING INFORMATION MODELS

(75) Inventors: Martin Grosshart, Stuttgart (DE); Ralf Martmann, Kornwestheim (DE); Ingo Meyer, Stuttgart (DE)

(73) Assignee: Alcatel, Paris (FR)

( * ) Notice: Subject to any disclaimer, the term of this patent is extended or adjusted under 35 U.S.C. 154(b) by 644 days.

(21) Appl. No.: 09/902,579

(22) Filed: Jul. 12, 2001

(65) Prior Publication Data

US 2002/0082904 A1 Jun. 27, 2002

(30) Foreign Application Priority Data

Jul. 12, 2000 (DE) .......................................... 100 33 812

(51) Int. Cl.$^7$ .............................. G06F 9/44; G06F 7/00
(52) U.S. Cl. ..................................... 717/104; 707/104.1
(58) Field of Search ................................ 717/100–109, 717/114, 116, 120–123; 709/223; 707/104.1

(56) References Cited

U.S. PATENT DOCUMENTS 6,237,136 B1 * 5/2001 Sadahiro ...................... 717/110
2004/0167764 A1 * 8/2004 Wohl et al. ..................... 703/14

OTHER PUBLICATIONS

International Standard X.724, Oct. 1996.
International Standard X.208, 1988.
International Standard X.722, 1992.

* cited by examiner

*Primary Examiner*—Anthony Nguyen-Ba
(74) *Attorney, Agent, or Firm*—Sughrue Mion, PLLC

(57) ABSTRACT

The invention relates to a process for generating information models and also to an information-processing system and a software product for implementing the process. A first, master information model is generated in coded form in a first description language and is stored in a database. One or more second, product-specific information models are generated from the master information model by means of first selection parameters and, in each case, stored in a database.

21 Claims, 4 Drawing Sheets

Fig. 4

1.1.2 Attribute Support

| In-dex | St a-tus | Attribute | | | ds3MonitoringCTPB idirectional | | |
|---|---|---|---|---|---|---|---|
| | | | | | 1641SX-A, 1641SX-B, 1641SX-C, 1641SX-D, 1644SX-A, 1644SX-B | | |
| | | | | | Sup-port | Additional Information | |
| | | | Property | | | System | |
| 1 | c | accessControlDomain | | | N | 1644SX, 1641SX-A, 1641SX-B, 1641SX-C | |
| | | | | | Y | 1641SX-D | |
| | | | DEFAULT VALUE | | Y | | CommonTSD-IM.accessControlDomainDefault |
| | | | GET | | Y | | |
| | | | MATCHES FOR | EQUALITY | Y | | |
| | | | | SUBSTRING | Y | | |
| | | | REPLACE | | Y | | |
| | | | REPLACE WD | | Y | | |
| 2 | m | alarmSeverityAssignmentProfilePointer | | | N | 1644SX-B | unidirectional relationship |
| | | | | | Y | 1641SX, 1644SX-A | unidirectional relationship |
| | | | DEFAULT VALUE | | Y | 1641SX-A, 1641SX-B | TransmissionProfileSpecific B. alarmSe verityAssignmentProfilePointerDV |
| | | | | | | 1644SX-A | TransmissionProfileSpecificB.alsCon-trolEnableDV |
| | | | GET | | Y | | |
| | | | MATCHES FOR | EQUALITY | Y | | |
| | | | REPLACE | | N | 1644SX-A | |
| | | | | | Y | 1641SX | |

PROCESS FOR GENERATING INFORMATION MODELS

BACKGROUND OF THE INVENTION

The invention relates to methods for generating information models and also to information-processing systems and software products for implementing such processes.

An individual, specific information model is usually developed for each software product to be developed. This information model then serves as a template for the software developers who then code the software for the product to be created, in accordance with the presets of this specific information model.

SUMMARY OF THE INVENTION

The object underlying the invention is to accelerate the development of software products.

This object is achieved by virtue of methods according to the teaching of claims 1 and 7 and also by virtue of an information-processing system and software products according to the teaching of claims 10 and 11, respectively.

The following advantages arise as a result. The distribution of the development over various locations is assisted. The inconsistency of information models can be recognised at an early stage of product development and effectively eliminated. Further advantages arise in the case of an amendment of requirements that products have to meet or in the case of incremental product development. The necessary adaptations of the product can be located quickly and effectively. Furthermore, automatic creation of adapted software components is made possible.

Advantageous configurations of the invention can be inferred from the dependent claims.

BRIEF DESCRIPTION OF THE DRAWINGS

The invention will be elucidated in exemplary manner in the following on the basis of several embodiment examples with the aid of the enclosed drawings.

FIG. 4 shows the representation of a product profile.

DETAILED DESCRIPTION OF THE INVENTION

Information models are used in network-management architectures in order to specify the management interfaces between the systems and within the systems of a network that is managed by the network management system.

The information models are encoded in a standardized description language. Such description languages are, for example, ASN.1/GDMO (see ITU-T X.722 and X.208), SNMP or IDL/CORBA. In this connection, the information models define the type of the information exchanged between the systems. In principle, the various systems that are integrated within a network management system can be divided up into a plurality of different types of network elements and into a plurality of different types of network managers and operating systems that implement different network-management levels. Of course, it is also possible for other systems, for example traffic control systems or e-commerce systems, also to be described by means of an information model. The invention is also applicable to these information models.

The implementation of the processes according to the invention and the mode of operation of a system according to the invention and software product will be elucidated in exemplary manner in the following on the basis of information models in the domain of network management systems.

Figure 1:
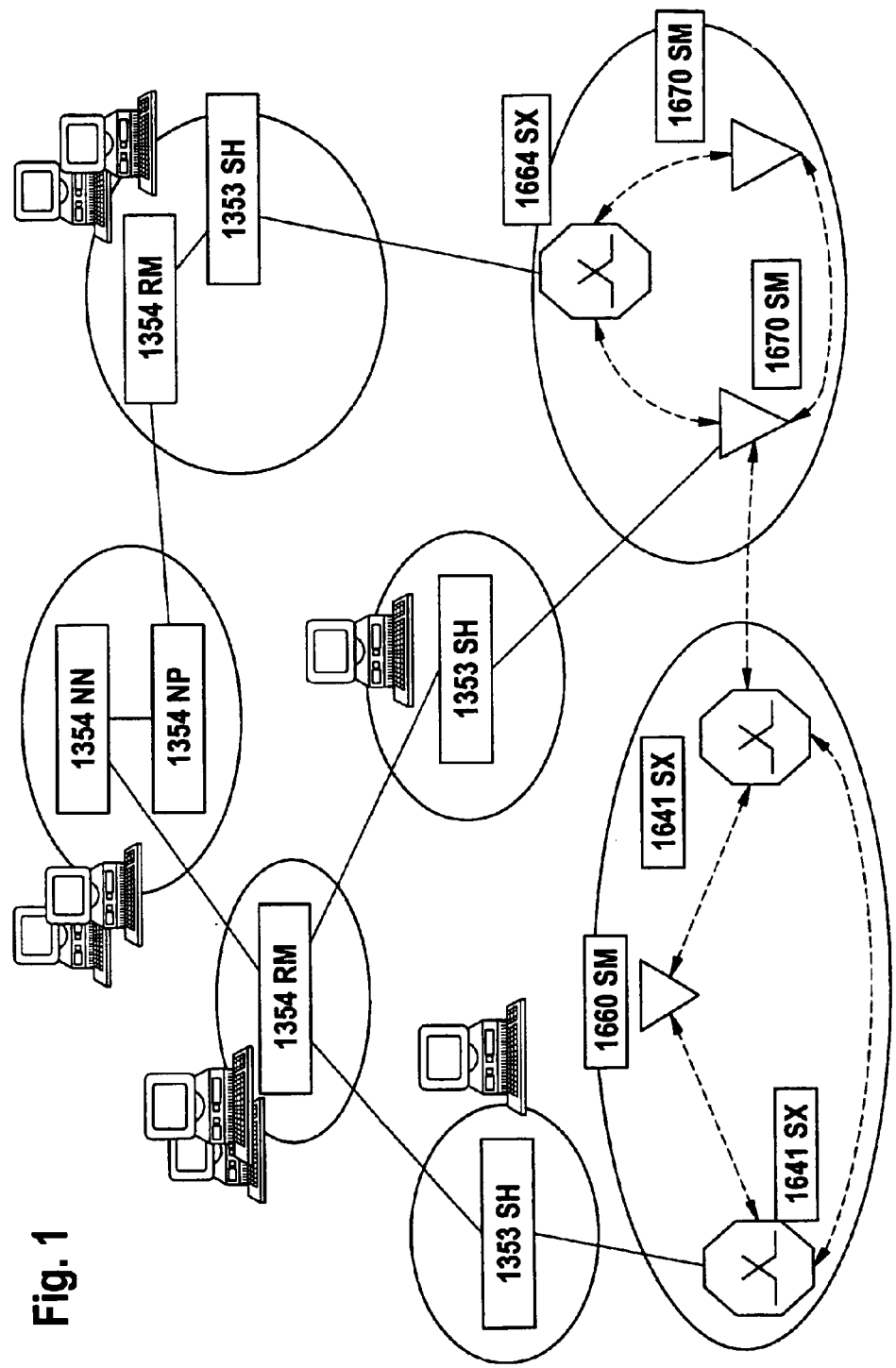
FIG. 1 shows a block diagram of a network management system.

FIG. 1 shows, in exemplary manner, the architecture of a network management system for an SDH communications network. It comprises digital cross-connects (1641SX, 1664SX), add/drop multiplexers (1660SM, . . . ) as network elements. On the Element Manager level, groups of network elements are controlled and monitored by managers (1354RM) which in turn are controlled and monitored by further managers (1354RM, 1354NN, 1354NP, 1354RM).

In this connection, the information models describe the interfaces between the manager applications and the agents. A manager sends a request, which is constructed in a predefined format (e.g. CMISE via CMIP), to the agent and the agent processes this request. In order to describe the management capability of an agent, an object-oriented approach is used for the description language by means of which information systems are described. Object classes are used within the description language. During operation, the agent holds instances of such object classes, which constitute the so-called Management Information Base (MIB).

In this connection, an object class contains inheritances from other object classes and a collection of packets. Each packet itself contains attributes and operations on these attributes. Furthermore, notifications and actions can be specified within the packets. In order to take the peculiarities of the hardware of varying manufacturers into account, these peculiarities can be defined as a condition for a certain object class. This means that these object classes do not have to be present in all cases. But, in contrast to this, there are also packets that represent functionalities that have to be present whenever an instance of an object class is generated. Furthermore, naming-rules define an inheritance relationship between objects and the naming of objects.

The description language is the description language ASN.1/GDEMO, but use may also be made of the other aforementioned description languages.

In the following, an information-processing system with a software product controlling the functions of the information-processing system described in the following will now be described which assists the work with information models and the generation of information models. In this connection, such a software product may consist of one or more application programs which run on a system platform and which control the functions described in the following. But this software product may also be a data carrier on which this application program or these application programs is/are stored. In this connection, a system platform consists of one or more computers connected to one another, which constitute the hardware platform, and of a software platform sitting on top of said computers, for example an operating system and a database.

Figure 2:
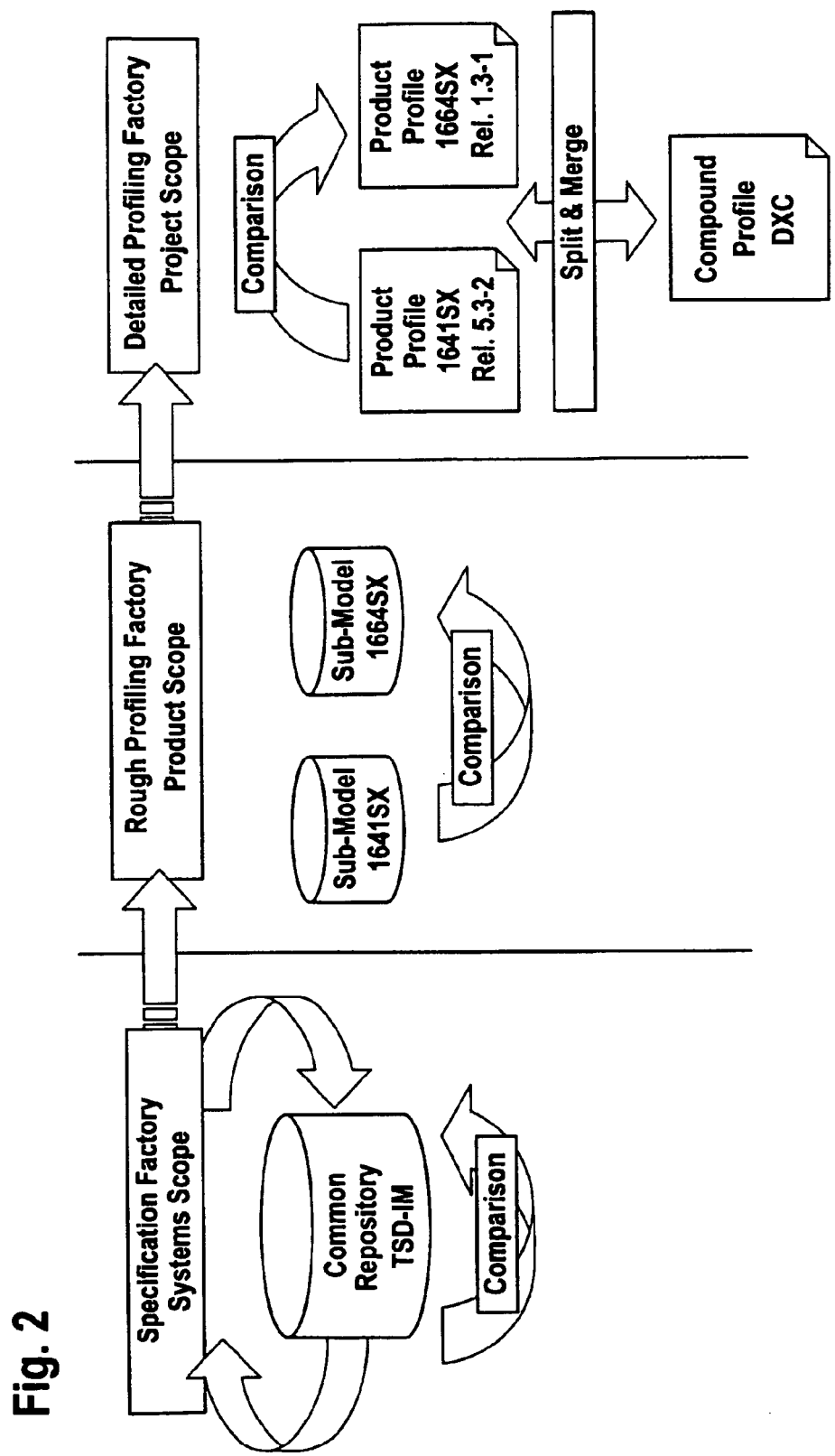
FIG. 2 shows a functional representation of an information-processing system according to the invention.

The basic functions of the information-processing system are represented in FIG. 2.

The fundamental idea of the concept consists in providing a single common source of information-model definitions. This master information model has to be correct, complete and consistent. It makes available the management specifications for the entire network.

Submodels for each concrete system or product that is part of the network are now extracted from this global source by a "rough profiling" process. This submodel contains only those definitions which are relevant within the context of the specific product. In this sense these submodels each constitute product-specific information models. These submodels also each have to be correct, complete and consistent in themselves.

A product-specific submodel is now further refined by a "detailed profiling" process in such a manner that it contains the specific restrictions of the specific product. Supported and unsupported features are formally described, either for the product in general or for a concrete evolutionary step (release) of the product. The detailed product profiles of several products can be summarised in a detailed description of a group of products. Similarly, product profiles of summarised systems can be broken down into the detailed description of the individual systems.

Complete information models, rough profiles and detailed profiles can be compared, in order to extract the differences. These differences are emphasised in a graphical user interface, so that the user can recognise the differences quickly. The detailed profiles are used in order to generate conformity statements according to ITU-T X.724 (MOCS) or according to a proprietary format. Furthermore, all types of documentation as well as software components for network elements and managers can be generated automatically from the information models. An example of such documentation is an HTML representation of the information model, which can be accessed by means of a browser.

The detailed mode of operation of the information-processing system will be described in the following.

The basic method for generating and maintaining the global source of master information consists in breaking down the GDMO and ASN.1 definitions which are available in the form of ASCII input files. Depending on the complexity of the overall system, a plurality of such input files which each define different subcomponents and aspects of the overall system has to be processed. During the breakdown, syntactical errors are signalled to the user. The resulting source (repository) is checked for completeness, and unresolved links between definitions are identified. Consistency checks are carried out in order to identify inconsistencies of type between the GDMO and the ASN.1 parts. Contradictory specifications from various input files are ascertained, recognised and signalled to the user.

If the break-down process has been carried out successfully, a correct, complete and consistent information-model source for the entire network is available as a result. As represented in FIG. 2, this information source forms the basis for each more extensive processing of information models.

Figure 3:
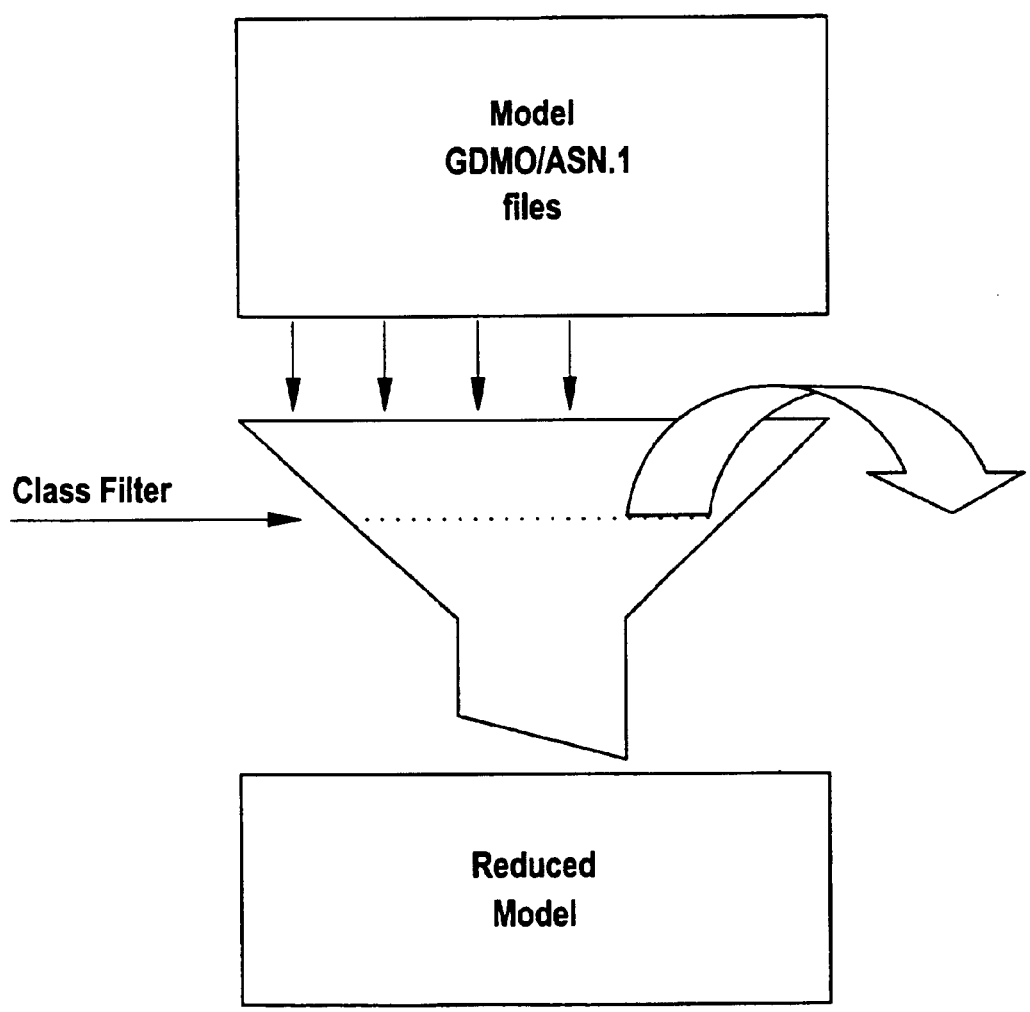
FIG. 3 shows a functional representation of a subfunction of the information-processing system according to the invention as shown in FIG. 2.

In the "rough profiling" process, product-specific profiles are extracted from the global master information model. The "rough profiling" process is represented in FIG. 3.

A specific product, for example an agent or a manager, implements only a subset of the object classes that are contained in the master information model. Based on a list of instanceable object classes, all GDMO and ASN.1 definitions linked to said object classes are collected recursively from the information-model source. The result is a submodel that contains all the relevant definitions for a specific product. This submodel is also designated as a "rough profile". This rough profile is used as a basis for the further refinement of the product specification. It also forms the basis for the development of the specific product and also for the generation of software components for the specific product by means of code-generators. Further documents, which give an overview of the functionalities additionally required for the specific product and which can also be used as a basis of contracts with development teams, are generated from the rough profile. An estimate of the development expenditure for the specific product can furthermore be generated automatically from the rough profile.

In the "detailed profiling" process, supported and unsupported performance features are specified and hence project-specific information models are generated.

This process permits further refinement of the rough profiles into detailed profiles. By using a formal description notation, specific refinements and restrictions for specific products or product releases are defined. A list of performance features that has been drawn up in accordance with this notation specifies, on all levels of the GDMO structure, which performance features (attributes, actions, notifications, . . . ) are generally supported or not supported. For example, it can be specified in this list that a certain packet which is not absolutely necessary (conditional packet) is always or never supported by the concrete product. Special rules can be refined by means of exceptions. For example, a packet may be supported generally but not supported for a certain object class.

This list of performance features is used in the "detailed profiling" process in order to generate a synoptic representation of the instanceable object classes of the product-specific information model from the rough profile of the product.

From a product-specific information model a project-specific information model is consequently generated, by means of this list, that contains only those object classes of the product-related information model which are instanceable in accordance with the information contained in the list. With a view to generating the project-specific information model, in this way those object classes are ascertained which are intended to be instanceable in accordance with the project-specific list for the respective project. These object classes are then extracted from the product-specific information model, and in this way the project-specific information model is generated.

Automatic software components for the specific product can be generated from the project-specific information model by means of code-generators. Furthermore, a diverse product profile, but also several diverse product profiles, of the specific product can also be generated from the project-specific information model. A product profile describes the properties of a specific product. A "detailed profile" is such a product profile.

The detailed profile is a specific representation of the project-specific information model that classifies the instanceable object classes in a synoptic representation. The expression "synoptic" in this context means that the inheritance structures of the object classes are ignored and all the inherited performance features are collected in a complete description of the instanceable classes. This makes it possible to generate a complete overview of the supported performance features of each implemented class of the product. FIG. 4 shows, in exemplary manner, a section of a detailed profile. It is also possible to generate a detailed profile directly from a product-related information model.

It is possible to generate conformity statements from the detailed profile.

The system further advantageously supports the comparison of information models and/or detailed profiles.

The comparison of the master information model with the product-related information models is carried out in order to ascertain which products are affected by an amendment to the global master information model. It is further ascertained which classes are affected by such an amendment (comparison on class level).

The comparison of detailed profiles is carried out in order to ascertain differences between two releases of a product or in order to compare the requisite profile of a product with the implemented profile of the product. In this connection, the differences are advantageously made clear by the system through varying choice of colour on a graphical user interface.

Lists of performance features can be drawn up for individual systems or for a group of systems. A detailed profile for a group of systems that has been drawn up by means of such a list can be split up into the product profiles of the individual systems. Conversely, product profiles of individual systems can be combined in a product profile for an overall system.

What is claimed is:

1. A method for generating information models, comprising:
   incorporating definitions of a plurality of subcomponents of an overall system to generate a first information model in coded form in a first description language;
   storing the first information model in a computer running a first database;
   using the first information model to generate one or more product-specific information models by selecting one or more first parameters;
   storing the one or more product-specific information models in a computer running a second database;
   using the one or more product-specific information models to generate one or more project-specific information models by selecting one or more second parameters; and
   storing the one or more project-specific information models in a computer running a third database.

2. A method according to claim 1, wherein the one or more product-specific information models are coded in a second description language different from the first description language.

3. A method according to claim 1, wherein the one or more product-specific information models describe one or more network elements of a communications network.

4. A method according to claim 1, further comprising using the one or more product-specific information models to generate one or more software components for one or more network elements of a communications network.

5. A method for generating information models according to claim 1, further comprising an integrated database structure comprising the first database and the second database.

6. A method for generating information models according to claim 1, further comprising an integrated database structure comprising two or more of the first database, the second database and the third database.

7. A method for generating information models according to claim 1, further comprising signaling a syntactical error when at least one syntactical error exists in the definitions of the subcomponents.

8. A method for generating information models according to claim 1, further comprising identifying an unresolved link when at least one unresolved link exists between the definitions of the subcomponents.

9. A method for generating information models according to claim 1, further comprising recognizing and signaling a contradictory specification among the definitions when the contradictory specification among the definitions of the subcomponents exists.

10. A method for processing information models, comprising:
    incorporating definitions of a plurality of subcomponents of an overall system to generate a first information model in coded form in a first description language;
    storing the first information model in a computer running a first database;
    using the first information model to generate one or more product profiles or a comparison of two or more product profiles;
    storing the one or more product profiles or the comparison of two or more product profiles in a computer running a second database;
    using the first information model to generate one or more product-specific information models by selecting one or more first parameters;
    storing the one or more product-specific information models in a computer running a third database;
    using the one or more product-related information models to generate one or more, project-specific information models by selecting one or more second parameters;
    storing the one or more project-specific information models in a computer running a fourth database;
    using the one or more project-specific information models to generate one or more product profiles or a comparison of two or more product profiles; and
    storing the one or more product profiles or the comparison of two or more product profiles in a computer running a fifth database.

11. A method according to claim 10, further comprising:
    storing the one or more product profiles or the comparison of two or more product profiles in a computer running a fourth database.

12. A method for processing information models according to claim 11, further comprising an integrated database structure comprising two or more of the first database, the second database, the third database and the fourth database.

13. A method for processing information models according to claim 10, further comprising an integrated database structure comprising the first database and the second database.

14. A method for processing information models according to claim 10, further comprising an integrated database structure comprising two or more of the first database, the second database, the third database, the fourth database and the fifth database.

15. A method for processing information models according to claim 10, further comprising signaling a syntactical error when at least one syntactical error exists in the definitions of the subcomponents.

16. A method for processing information models according to claim 10, further comprising identifying an unresolved link when at least one unresolved link exists between the definitions of the subcomponents.

17. A method for processing information models according to claim 10, further comprising recognizing and signaling a contradictory specification among the definitions when the contradictory specification among the definitions of the subcomponents exists.

18. An information-processing system tangibly embodied on a program storage medium readable by a computer and embodying one or more instructions executable by the computer to implement a method of generating information models, said method comprising:

incorporating definitions of a plurality of subcomponents of an overall system to generate a first information model in coded form in a first description language;

storing the first information model in a computer running a first database;

using the first information model to generate one or more product-specific information models by selecting one or more first parameters;

storing the one or more product-specific information models in a computer running a second database;

using the one or more product-specific information models to generate one or more project-specific information models by selecting one or more second parameters; and storing the one or more project-specific information models in a computer running a third database.

19. An information-processing system according to claim 18, wherein said method further comprises:

using the first information model to generate one or more product profiles or a comparison of two or more product profiles; and storing the one or more product profiles or the comparison of two or more product profiles in a computer running a fourth database.

20. A software product tangibly embodied on a program storage medium readable by a computer and embodying one or more instructions executable by the computer to implement a method of generating information models, said method comprising:

incorporating definitions of a plurality of subcomponents of an overall system to generate a first information model in coded form in a first description language;

storing the first information model in a computer running a first database;

using the first information model to generate one or more product-specific information models by selecting one or more first parameters;

storing the one or more product-specific information models in a computer running a second database;

using the one or more product-specific information models to generate one or more project-specific information models by selecting one or more second parameters; and storing the one or more project-specific information models in a computer running a third database.

21. A software product according to claim 20, wherein said method further comprises:

using the first information model to generate one or more product profiles or a comparison of two or more product profiles; and storing the one or more product profiles or the comparison of two or more product profiles in a computer running a fourth database.

* * * * *